United States Patent
Kouzel (10) Patent No.: US 12,539,491 B2
(45) Date of Patent: Feb. 3, 2026

(54) SYSTEMS AND METHODS FOR WATER REMOVAL IN COMPRESSORS

(71) Applicant: Doosan Bobcat North America, Inc., West Fargo, ND (US)

(72) Inventor: Richard L. Kouzel, Mooresville, NC (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 421 days.

(21) Appl. No.: 18/333,739

(22) Filed: Jun. 13, 2023

(65) Prior Publication Data

US 2023/0398488 A1     Dec. 14, 2023

Related U.S. Application Data

(60) Provisional application No. 63/351,523, filed on Jun. 13, 2022.

(51) Int. Cl.
| | | |
|---|---|---|
| *B01D 53/30* | (2006.01) | |
| *B01D 17/02* | (2006.01) | |
| *B01D 17/12* | (2006.01) | |
| *B01D 53/26* | (2006.01) | |

(52) U.S. Cl.
CPC ......... *B01D 53/30* (2013.01); *B01D 17/0214* (2013.01); *B01D 17/12* (2013.01); *B01D 53/265* (2013.01)

(58) Field of Classification Search
CPC .. B01D 53/30; B01D 53/265; B01D 17/0214; B01D 17/12; F04C 29/0092; F04C 2240/81; F04C 2270/185; F04C 2270/195; F04C 18/16; F04C 28/28; F04B 39/16; F04D 29/706
See application file for complete search history.

(56) References Cited

U.S. PATENT DOCUMENTS

| | | |
|---|---|---|
| 5,624,236 A | 4/1997 | Kubo et al. |
| 6,247,314 B1 | 6/2001 | Biehler |
| 2018/0017062 A1 | 1/2018 | Peters et al. |
| 2018/0223847 A1 | 8/2018 | Fujiwara |

FOREIGN PATENT DOCUMENTS

| | | | | |
|---|---|---|---|---|
| EP | 2277462 A1 | * | 1/2011 | ............. A61B 17/17 |
| GB | 2277462 A | * | 11/1994 | ............ F04C 29/026 |
| JP | 2004011426 A | | 1/2004 | |

OTHER PUBLICATIONS

International Searching Authority, International Search Report and Written Opinion from corresponding PCT Application No. PCT/US2023/068337, mailed Oct. 2, 2023 [11 pgs].

* cited by examiner

Primary Examiner — Emmanuel E Duke
(74) Attorney, Agent, or Firm — Quarles & Brady LLP (57) ABSTRACT

A fluid compressor system can include a compressor, a power source operably connected to the compressor to power the compressor, and a control system. The control system includes one or more control devices configured to determine a system temperature of the fluid compressor system, determine a target operating pressure based on the system temperature, and selectively operate the fluid compressor system in a water removal mode, including controlling a system pressure of the fluid compressor system based on the target operating pressure to vaporize liquid within the compressor system.

20 Claims, 3 Drawing Sheets

SYSTEMS AND METHODS FOR WATER REMOVAL IN COMPRESSORS

CROSS-REFERENCE TO RELATED APPLICATIONS

This application claims priority to U.S. provisional application No. 63/351,523, titled "SYSTEMS AND METHODS FOR WATER REMOVAL IN COMPRESSORS" and filed Jun. 13, 2022, the entirety of which is incorporated herein by reference.

BACKGROUND

The present disclosure relates to rotating machines. More particularly, the disclosure relates to fluid compressor systems (e.g., air compressor systems) that are operably powered by a power source (e.g., an internal combustion engine) to provide pressurized fluid flow. During operation of fluid compressor systems, including air compressors, compression of gases can result in liquid condensation, with resulting accumulation of liquid at different internal areas of the compressor system. For example, conventional air compressor systems commonly intake and pressurize ambient air containing water vapor. As a result, condensed water can tend to collect internally within the air compressor systems, particularly for high-pressure air compressor systems operated in humid ambient conditions.

The discussion above is merely provided for general background information and is not intended to be used as an aid in determining the scope of the claimed subject matter.

SUMMARY

Examples of the present disclosure, as generally disclosed herein, can relate to fluid compressor systems (e.g., air compressor systems) and methods for operation of a fluid compressor system to prevent condensed water from accumulating within, or to remove condensed water from, the fluid compressor system. In some cases, controlled reduction in operating pressure of a fluid compressor system can result in improved removal of condensation, including by flashing at least part of the condensation to vapor.

According to some aspects of the disclosure, a fluid compressor system can include a compressor, a power source, a separator tank, and a control system. The compressor can have a compressor inlet and a compressor outlet, and can be configured to receive fluid at the compressor inlet and supply compressed fluid at the compressor outlet. The power source can be operably connected to the compressor to power the compressor to supply the compressed fluid. The separator tank can be in fluid communication with the compressor outlet to receive the compressed fluid and separate entrained liquid from the compressed fluid. The control system can include one or more control devices that can be configured to: (i) determine a system temperature of the fluid compressor system; (ii) determine a target operating pressure based on the system temperature; and (iii) selectively operate the fluid compressor system in a water removal mode, including controlling a system pressure of the fluid compressor system based on the target operating pressure to vaporize at least part of the entrained liquid.

In some examples, the one or more control devices can be configured to control a solenoid valve that can be in fluid communication with the separator tank to control the system pressure.

In some examples, the one or more control devices can be configured to operate the fluid compressor system in the water removal mode for a predetermined amount of time.

In some examples, the power source can be an engine, and the control system can be configured to operate the engine at substantially the same speed while the fluid compressor system is operated in a pressure supply mode and while the fluid compressor system is operated in the water removal mode.

In some examples, the control system can further include a temperature sensor that can be configured to sense the system temperature, and the one or more control devices can be further configured to determine the target operating pressure in response to signals from the temperature sensor.

In some examples, the control system can further include a moisture sensor that can be configured to sense a water content associated with the fluid compressor system. The control system can be further configured to automatically cause the fluid compressor system to operate in the water removal mode in response to signals from the moisture sensor. In some examples, the water content can indicate an ambient humidity external to the fluid compressor system. In some examples, the water content can indicate an amount of liquid water within a volume of oil within the fluid compressor system. In some examples, the control system can be further configured to operate the fluid compressor system in the water removal mode until the amount of liquid water within the volume of oil is reduced to a predetermined amount.

In some examples, the control system can be configured to operate the fluid compressor system in the water removal mode automatically as part of at least one of a startup process or a shutdown process for the fluid compressor system.

According to other aspects of the disclosure, a fluid compressor system can include a compressor, a power source, a separator tank, and a control system. The compressor can have a compressor inlet and a compressor outlet, and can be configured to receive fluid at the compressor inlet and supply compressed fluid at the compressor outlet. The power source can be operably connected to the compressor to power the compressor to supply the compressed fluid. The separator tank can be in fluid communication with the compressor outlet to receive the compressed fluid and separate entrained liquid from the compressed fluid. The control system can include one or more control devices that can be configured to: (i) determine a target operating temperature; and (ii) selectively operate the fluid compressor system in a condensation prevention mode, including controlling a system temperature of the fluid compressor system based on the target operating temperature, so as to reduce condensation of water entrained within the compressed fluid.

In some examples, the control system can further comprise a moisture sensor configured to sense a water content associated with the fluid compressor system. The control system can be further configured to automatically cause the fluid compressor system to operate in the condensation prevention mode in response to signals from the moisture sensor.

In some examples, the water content can indicate an ambient humidity external to the fluid compressor system.

In some examples, the water content can indicate an internal humidity within the fluid compressor system.

In some examples, the fluid compressor system can include an oil cooler arranged to cool oil for the compressor and a control valve arranged to control flow of oil to or from the oil cooler. The control system can be further configured to control the system temperature by selectively controlling the control valve based on the target operating temperature.

In some examples, the control system can be further configured to cause the fluid compressor system to operate in the condensation prevention mode then transition to a water removal mode that includes: determining a current system temperature of the fluid compressor system; determining a target operating pressure based on the current system temperature; and selectively operate the fluid compressor system in a water removal mode, including controlling a system pressure of the fluid compressor system based on the target operating pressure to vaporize entrained liquid within the fluid compressor system.

According to other aspects of the disclosure, a method of operating a fluid compressor system can include the steps of determining, with a control device, a system temperature of the fluid compressor system and a target operating pressure based on the system temperature of the fluid compressor system. Additionally, the method can include the steps of operating the fluid compressor system, with the control device, in a water removal mode to one or more of: (i) reduce a system pressure of the fluid compressor system to at or below the target operating pressure to vaporize water from the compressed fluid; or (ii) maintain the system pressure of the fluid compressor system at or below the target operating pressure to vaporize water from the compressed fluid.

In some examples, determining the system temperature can include determining the system temperature as a first system temperature during operation of the fluid compressor system at a first operating pressure. Operation of the fluid compressor system in the water removal mode can include determining the target operating pressure to be less than the first operating pressure.

In some examples, operation of the fluid compressor system in the water removal mode can be included in operation of the fluid compressor system in a startup mode. After operating in the startup mode, the fluid compressor system can be operated in a pressure supply mode with the fluid compressor system at a second operating pressure that is greater than the target operating pressure.

In some examples, operation of the fluid compressor system in the water removal mode can be included in operation of the fluid compressor system according to a predetermined shutdown sequence for the fluid compressor system.

In some examples, operation of the fluid compressor system in the water removal mode can be ended based on a sensed moisture within the fluid compressor system.

In some examples, operation of the fluid compressor system in the water removal mode can be ended after a predetermined time of operating in the water removal mode.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

The accompanying drawings, which are incorporated in and form a part of this specification, illustrate examples of the disclosed technology and, together with the description, serve to explain the principles of examples of the disclosed technology.

DETAILED DESCRIPTION

The concepts disclosed in this discussion are described and illustrated by referring to exemplary implementations. These concepts, however, are not limited in their application to the details of construction and the arrangement of components in the illustrative implementations and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

As briefly described above, operation of compressor systems (e.g., an air compressor system) can result in condensation of liquid (e.g., atmospheric water) within parts of the compressor systems as a result of cooling below the pressure dew point. Once condensed, this water typically cannot escape from the compressor system via vaporization because a system operating pressure commonly exceeds a saturation pressure that is associated with a system operating temperature. For example, after system startup, the system pressure of an air compressor system may generally increase significantly above the saturation pressure at the present operating temperature such that the accumulated water becomes locked in a compressed liquid state. As such, this condensed water can accumulate within a separator tank or other pressurized tank of the compressor system, or in other locations (e.g., in pipes downstream of an oil cooler of the compressor system). This accumulation of liquid can be detrimental to system operation, including, for example, due to the formation of oil-water emulsions in oil-lubricated compression systems, in particular an oil-flooded screw compressors. Thus, in conventional systems, liquid water may need to be removed by regular manually operated drainage or other measures (e.g., by a dedicated pump, or via flow driven by the gas pressure in a separator tank).

Some examples of the disclosed technology can provide improved systems and methods to address these problems, including by generally reducing accumulation of condensation for compressor systems. In particular, by controllably reducing a system pressure to or below a relevant saturation pressure over a period of time (e.g., by operating an air compressor system in a "water removal mode"), accumulated water can be caused to quickly vaporize and the resulting water vapor can be routed out of the air compressor system. Additionally, as compared with a conventional air compressor system, the control system can provide water removal from the air compressor system during or shortly after the start of operation of the air compressor system.

In some examples, a fluid compressor system can include a control system that is configured to operate the compressor system in a water removal mode for a predetermined period of time, or based on input signals from one or more sensors or input devices, to vaporize accumulated and entrained water in the compressor system. For example, a control system can be configured to monitor one or more operating conditions internal or external to the fluid compressor system and control operation of the system in a water removal mode accordingly. In some cases, a control system can be configured to operate a compressor system in a water removal mode in response to a user input or automatically in response to one or more of: (i) a startup of the compressor system; (ii) completing a predetermined time period of continued operation of the compressor system; (iii) one or more operating conditions reaching a predetermined level during continued operation of the compressor system (e.g., as indicated by one or more pressure, temperature, moisture, or other sensors); (iv) cessation of operation of the compressor system (e.g., as part of an automatic or programmed shutdown process); or (v) in response to a user request (e.g., as indicated by an integrated button or other input device).

Relatedly, in some examples, a method of operating a fluid compressor system can selectively control a fluid compressor system to operate under conditions in which condensed water accumulated within the fluid compressor system is vaporized. For example, a control system of the fluid compressor system can be configured to determine a relevant system temperature of the fluid compressor system. Using the determined system temperature, the control system can be further configured to determine a target operating pressure based on the system temperature. For example, the target operating pressure can be in a range of pressure values that is less than or equal to a saturation pressure for water that corresponds to the system temperature. With the target operating pressure determined, the control system can then cause the fluid compressor system to operate at or below the target operating pressure, in a water removal mode, to vaporize liquid condensed water within the compressor system.

In some cases, a control system can be configured to maintain the system pressure of the fluid compressor system at or below the target operating pressure for a predetermined amount of time. In some cases, a control system can maintain the system pressure at or below a target operating pressure for a variable amount of time, including as informed by signals from one or more sensors on or around the fluid compressor system, as may allow a substantial portion of available liquid water to be vaporized for any given operating condition. For example, a control system can be configured to monitor moisture levels within the fluid compressor system and can cause the fluid compressor system to continue operating in the water removal mode until the determined moisture level is reduced to a predetermined acceptable level.

Further, operation of compressor systems (e.g., an air compressor system) can result in condensation of liquid (e.g., atmospheric water) from within parts (e.g., tanks) of the compressor systems when a temperature of compressed air within the system (i.e., a system temperature) decreases to at or below a dew point temperature (i.e., the temperature at which water begins to condense out of the compressed air), which can be dependent on the ambient operating conditions of a compressor system from which ambient air enters the system. For example, during continuous operations, a system temperature of an air compressor system may generally decrease below a dew point temperature of compressed air within the system such that water vapor within the compressed air condenses and accumulates within a separator or other pressurized tank (or other volume) of the air compressor system.

In some implementations, condensation of water vapor and corresponding accumulation of liquid within an air compressor system can be reduced (e.g., eliminated) by controlling operations so that a relevant system temperature does not decrease below a threshold temperature (e.g., below a dew point temperature for the present environmental or operating conditions). In some implementations, a compressor system can include a control system that can be configured to operate the compressor system in a "condensation prevention mode" in which cooling of a compressor (or other component) can be controlled to ensure a sufficiently elevated temperature (e.g., for a predetermined period of time, or based on input signals from one or more sensors or input devices), to prevent water vapor from condensing and accumulating in the compressor system. For example, in some condensation prevention modes, a control system can be configured to identify a relevant target temperature based on sensing one or more operating conditions internal or external to the compressor system and then to control coolant flow through a cooling bypass circuit to control a system temperature (e.g., at a compressor outlet, or within a tank) based on the target temperature.

Figure 1:
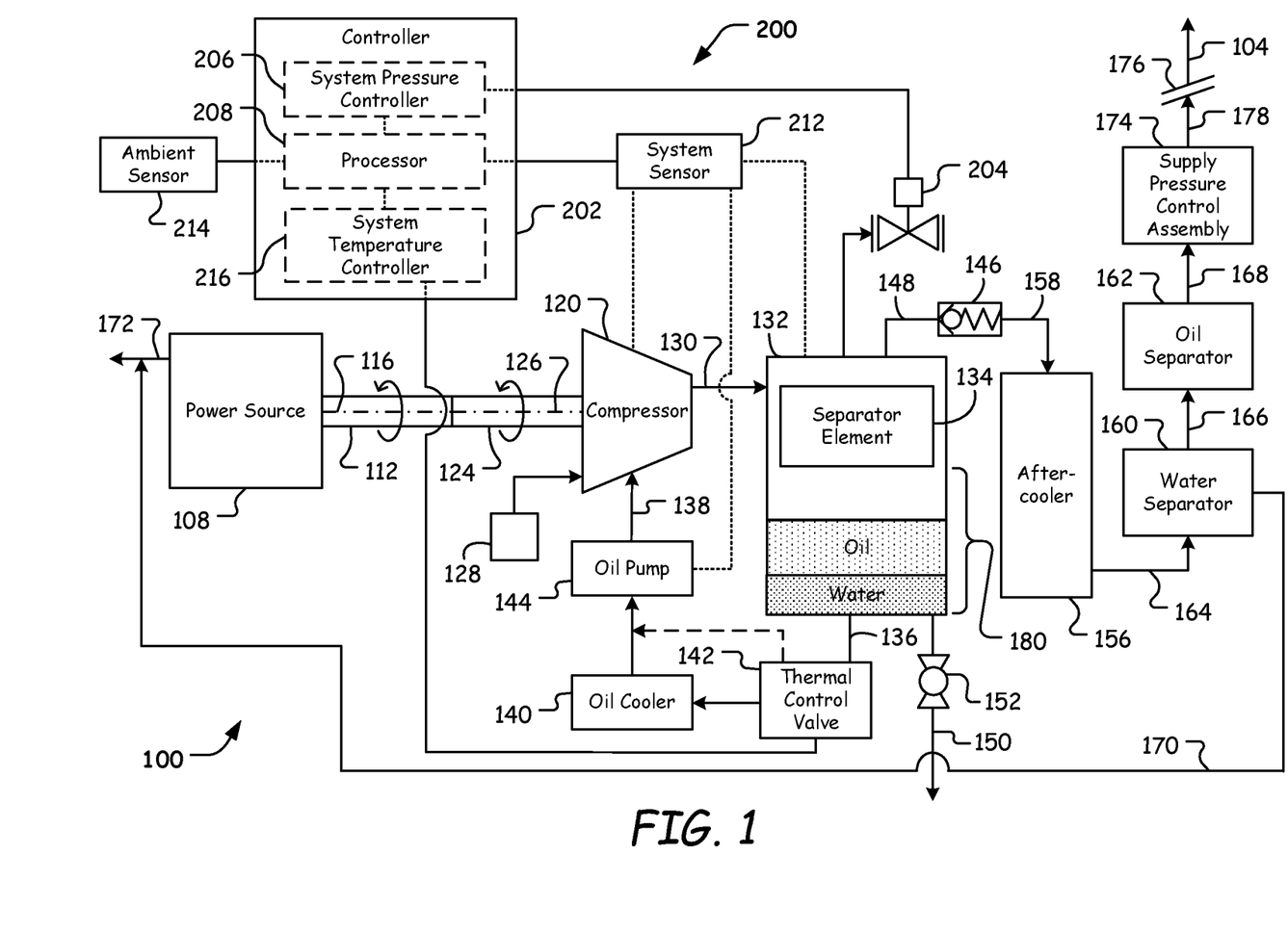
FIG. 1 is a schematic view of a fluid compressor system configured to be operable in a water removal mode and a condensation prevention mode, according to aspects of the disclosure.

The concepts described herein can be practiced on a variety of different types of rotating machinery. A representative rotating machine system on which aspects of the disclosure can be practiced is illustrated in FIG. 1. For the sake of brevity, only one rotating machine system is illustrated and discussed as being a representative rotating machine system. However, as mentioned above, the implementations described below can be practiced on any of a number of rotating machines with working fluids and operating conditions that can exhibit similar condensation issues.

FIG. 1 is a schematic illustration of the representative rotating machine configured as a fluid compressor system 100, which can be configured to generate and discharge an air flow or another compressed gas (e.g., a refrigerant). The fluid compressor system 100 generally includes a power source that is configured to provide power (e.g., rotational power) to a driven component. In the illustrated example, the fluid compressor system 100 is configured as an air compressor system (e.g., a single-stage air compressor system) that is configured to take in and pressurize atmospheric or ambient air to provide a pressurized air flow to a job site via a supply line 104 (e.g., a service line). In other examples, a fluid compressor system can be a multi-stage compressor system, such as, a two-stage air compressor system. In some cases, the fluid compressor system 100 can be configured as a portable compressor system that can be moved between various job sites, or as a stationary (e.g., permanent) compressor system.

To compress atmospheric air and provide an air flow at the supply line 104, the compressor system 100 includes a power source configured as an engine 108 (e.g., a diesel engine or another type of internal combustion engine), although other types of power sources can also be used. The engine 108 includes and is configured to rotate an output shaft 112, for example, a crankshaft or flywheel, about a first rotational axis 116. The output shaft 112 can be configured to provide (rotational) power to a driven device, namely, a compressor 120 (e.g., an oil-flooded compressor) that is configured to pressurize air and discharge an air flow. More specifically, the output shaft 112 can be coupled to an input shaft 124 of the compressor 120 that is configured to rotate about a second rotational axis 126 (e.g., that is coaxial with the first axis 116). Accordingly, the engine 108 can be operatively coupled to the compressor 120 so that the engine 108 powers the compressor 120.

With continued reference to FIG. 1, the compressor 120 can be configured as an oil-flooded screw compressor, in which oil flows around and between two counter-rotating screws to lubricate and improve sealing between components as the changing size of cells between the screws compresses air. For example, atmospheric air can be drawn into the compressor 120 at a compressor inlet via an air inlet valve 128 to be compressed by the rotation of the screws and then discharged from the compressor 120 as a high pressure flow at a compressor outlet 130.

During operation of the compressor 120 some of the oil may mix with the air to be carried through the compressor outlet 130. However, it is generally undesirable to provide operators with an air flow that contains oil. Accordingly, for example, compressed air from the compressor 120 can pass through the compressor outlet 130 to a separator tank 132 configured to separate oil from the pressurized air with a separator element (e.g., a filter or other mechanical separation element with structures to guide fluid flow or otherwise capture entrained oil droplets). Oil that is removed from the air by the separator element 134 can accumulate in a sump region 180 toward the bottom of the separator tank 132 and be drained (e.g., to an oil sump), while the pressurized air remains above the oil in the separator tank 132 to be provided for service on demand.

In some cases, oil that is removed from the air-oil mixture in the separator tank 132 can then be re-used to lubricate the compressor 120. In particular, the separator tank 132 can include an oil outlet 136 that allows oil from the oil sump to flow back into the compressor 120 via an oil inlet 138. In some cases, an oil cooler 140 can be disposed upstream of the oil inlet 138 between the separator tank 132 and the compressor 120 to provide a cooled oil flow to the compressor 120, which can help to cool the compressor 120 and other components of the compressor system 100 by removing at least some of the heat generated by compression of air within the compressor 120. In such cases, a thermal control valve 142 can be disposed upstream of the oil inlet 138 between the separator tank 132 and the compressor 120 that can be configured to selectively direct flow of oil from the oil sump to the oil cooler 140 (as indicated by the solid line in FIG. 1) or to the compressor 120, by bypassing the oil cooler 140 (as indicated by the dashed line in FIG. 1). In such cases, the thermal control valve 142 can be mechanically operated (e.g., a slide valve having a wax plug) or electronically controlled to selectively direct flow along the oil inlet 138. In some cases, the pressure of air within the separator tank 132 can drive oil flow along the return path to the compressor 120. In some cases, an oil pump 144 can be disposed upstream of the oil inlet 138, between the separator tank 132 and the compressor 120, to provide increased circulation of oil to and within the compressor 120, which can provide increased lubrication, cooling, and sealing for components of the compressor 120. In such cases, the oil pump 144 can be powered directly by the engine 108, by rotation of the compressor 120, or by an external power source (not shown).

In some examples, a separator tank can also serve as a storage tank that can store pressurized air from a compressor for use when needed at a supply line. In this regard, the separator tank 132 can serve as a buffer that stores a pressurized volume of air and thereby allows the compressor system 100 to provide air flow at flow rates that are greater than those that can be provided by the compressor 120 alone. Thus, in some cases, air within the separator tank 132 may be held at a pressure that is higher than a pressure supplied at the supply line 104. To maintain pressure within the separator tank 132, the compressor system 100 can include a minimum pressure valve 146 that is coupled to an air outlet 148 of the separator tank 132. For example, the minimum pressure valve 146 can be configured as a normally closed, spring biased check valve that only opens when the pressure of air passing through the air outlet 148 is great enough to overcome the force of the spring or other biasing element. In some cases, the minimum pressure valve 146 can be an adjustable pressure valve. Additionally, the minimum pressure valve 146 can also be configured to inhibit or prevent air or other material from reversing its flow direction and entering the separator tank 132, oil cooler 140, and compressor 120 from the downstream side (e.g., the supply line 104) of the compressor system 100. In other examples, the minimum pressure valve 146 can be provided along other points on the flow path between the separator tank 132 and the supply line 104.

In some examples, the separator tank 132 can include a drain line 150 with a drain valve 152 that may be used to drain accumulated condensed water that separates from the oil of the oil-water mixture (as shown in FIG. 1) from the compressor 120 after a sufficient period of time following operation of the compressor system 100. For example, the drain valve 152 may be a ball valve that can be manually opened to permit flow of separated water out of the separator tank 132 and the compressor system 100 along the drain line 150. In some cases, the drain valve 152 can be an electromechanically actuated valve (e.g., a solenoid-operated valve).

In some cases, a compressor system can optionally include additional components disposed between a compressor and a supply line to remove additional contaminants (e.g., water and oil) from the air flow. For example, the compressor system 100 includes an aftercooler 156 that is coupled with an outlet 158 of the minimum pressure valve 146. In some cases, the aftercooler 156 can be a heat exchanger that cools the air to remove heat produced during compression. Consequently, as the air cools within the aftercooler 156, the air approaches its dew point, which causes moisture to condense out of the air. Additionally, the compressor system 100 can also include a water separator 160 and an oil separator 162 (e.g., a filter) to remove any remaining oil and water from the air flow. As illustrated in FIG. 1, air flows from an outlet 164 of the aftercooler 156 to the water separator 160 for removal of water, and then from an air outlet 166 of the water separator 160 to the oil separator 162 for removal of oil, before continuing from an outlet 168 of the oil separator 162 toward the supply line 104.

In some examples, flow paths or other arrangements can be provided in a compressor system to further assist in removing liquid from a pressurized flow before the flow is provided to a user. For example, as discussed above, the water separator 160 can be configured to separate condensed water from the air flow. As such, the water separator 160 can include the air outlet 166 that permits flow of air and water vapor out of the water separator 160 along with a water outlet 170 that routes flow of condensed water from the water separator 160 to an exhaust system 172 of the engine 108 (e.g., a muffler). As the water is introduced into the exhaust system 172 (e.g., to contact flow ducts or other devices of the exhaust system 172), the water can be flashed off by high temperature exhaust gas flowing through the exhaust system 172. Relatedly, water vapor remaining in the air flow can be dispersed into the atmosphere as the air, with the entrained water vapor, flows out of the compressor system 100.

In some cases, prior to exiting the compressor system 100 at the supply line 104, pressurized air can pass from the oil separator outlet 168 and through a supply pressure control assembly 174. The supply pressure control assembly 174 can be configured to control a pressure of the air flow that is provided to the supply line 104 (e.g., a supply pressure of the compressor system 100) at a connection point 176 (e.g., a hose connector or other structure). Accordingly, pressurized air from the compressor system 100 can pass from the compressor 120 to the supply line 104, via an outlet 178 of the supply pressure control assembly 174, when the supply line 104 is coupled to the connection point 176. In some cases, the supply pressure control assembly 174 may be configured as an adjustable pressure control assembly that can be manipulated by a user to supply a desired air pressure at the supply line 104.

To monitor and otherwise control operations, a compressor system can generally include a controller (e.g., a control device or system) that can be configured to control one or more operational parameters of the compressor system. For example, the compressor system 100 includes a control system 200 that can be configured to control an operating pressure of the compressor system 100 (i.e., a system pressure $P_{system}$), including by directly controlling operation of the compressor 120, of one or more valves of the compressor system 100 (e.g., a pressure relief valve, as further discussed below), of the engine 108, etc.

The control system 200 can be implemented as one or more known types of processor devices (e.g., microcontrollers, field-programmable gate arrays, programmable logic controllers, logic gates, etc.), including as part of general or special purpose computers. In addition, the control system 200 can also include other generally known computing components, including memory, inputs, output devices, etc. (not shown), as appropriate. In this regard, the control system 200 can be configured to implement some or all of the operations of the control processes described herein, which can, as appropriate, be executed based on instructions or other data retrieved from memory. In some examples, the control system 200 can include multiple control devices (or modules) that can be integrated into a single component or arranged as multiple separate components. In some examples, the control system 200 can be part of a larger control system and can, accordingly, include or be in electronic communication with a variety of control modules (e.g., system pressure controllers, engine controllers, hub controllers, etc.). For example, as illustrated in FIG. 1, the control system 200 can include a controller 202 with one or more of a system pressure controller 206, a general purpose processor device 208, a dedicated engine controller (not shown), or various other control modules.

Generally, a controller can be configured to control a compressor system in response to a user input, or in response to one or more operational parameters of the compressor system. Correspondingly, the controller can also be configured to monitor one or more operational parameters of the compressor system. For example, the control system 200 can be configured to monitor a temperature of the compressor system 100 (i.e., a system temperature $T_{system}$), a moisture level within the compressor system 100 (i.e., a system moisture level), a humidity level of ambient air surrounding the compressor system 100 (i.e., an ambient humidity), or the system pressure $P_{system}$ (e.g., as indicated by one or more pressure transducers (not shown)). In some cases, a moisture level within the compressor system 100 can be monitored as a humidity level of compressed air within the compressor system 100 (i.e., an internal humidity).

As noted above, it may be useful to operate a compressor so that system pressure is temporarily and controllably reduced to flash off condensation within the compressor system. In some examples, the control system 200 can accordingly be configured to temporarily reduce the system pressure $P_{system}$ of the compressor system 100 to at or below a target operating pressure $P_{target}$ for vaporization of water within the system (e.g., to at or below a saturation pressure for a present system temperature $T_{system}$) while the compressor 120 continues to be powered by the engine 108. In such cases, the oil pump 144 can maintain oil flow to provide lubrication to certain components (e.g., that would not receive sufficient amounts of oil if oil flow depended solely on pressure within the separator tank 132). Generally, air compressor systems that include controls to reduce system pressures to vaporize condensed water will beneficially include oil pumps to maintain flow and lubrication to important components (e.g., bearings).

In some cases, a controller can be configured to control flow of compressed air within a compressor system in order to increase or decrease a system pressure $P_{system}$ without necessarily increasing or decreasing an output speed of the power source for powering the compressor (e.g., the speed of engine 108). For example, in the illustrated implementation of FIG. 1, the control system 200 of the compressor system 100 includes the general purpose controller 202 and a system pressure control device 204. In this implementation, the system pressure control device is a solenoid-operated block valve 204 arranged to control release of air (and pressure) from the separator tank 132. Thus, as controlled by the control system 200, the block valve 204 (or other valves of known types arranged with similar effect) can selectively reduce the system pressure $P_{system}$ of the compressor system 100 by venting air from the compressor system 100 or increase the system pressure $P_{system}$ by constricting (e.g., blocking) the release of compressed air from the separator tank 132. In other implementations, the system pressure control device 204 can be arranged differently. For example, the system pressure control device 204 can be arranged along the compressor outlet 130 of the compressor 120 or in other locations. In other implementations, as generally noted above, the system pressure control device 204 can include one or more other valves of types generally known in the art and can be disposed.

With continued reference to FIG. 1, the system pressure controller 206 can be configured to control operation of the system pressure control device 204. For example, in the illustrated implementation, the system pressure controller 206 is in communication with the block valve 204 and can thus be configured to cause the block valve 204 to open and close (e.g., by various incremental amounts that correspond to various levels of flow through the block valve 204 or pressures within the compressor system 100).

The control system 200 can also include or be in communication with a system sensor 212. The system sensor 212 can be configured to sense one or more operating parameters of the compressor system 100 (e.g., the system temperature $T_{system}$, the system pressure $P_{system}$, the system moisture level, etc.) and provide corresponding signals to the controller 202. For example, the system sensor 212 can be arranged to sense operating parameters for the compressor 120, the separator tank 132, or the oil pump 144.

In some examples, the system sensor 212 can be a pressure sensor configured to sense one or more pressures within the compressor system 100 (e.g., the system pressure $P_{system}$), such as, for example, the pressure within the separator tank 132. In some examples, the system sensor 212 can be a moisture sensor configured to sense a water content associated with the compressor system 100. For example, in some implementations, the system sensor 212 can be a moisture sensor configured to sense a water content within the compressor system 100, such as, for example, the presence of water within the separator tank 132. In such examples, the system sensor 212 can be a water contact sensor arranged in the sump region 180 of the separator tank 132.

In some examples, the system sensor 212 can be a water-in-oil sensor that is configured to detect the presence of water within a volume of oil. In some examples, the system sensor 212 can be a humidity sensor configured to sense an internal humidity of the compressor system 100, such as, a humidity level within the separator tank 132. In some examples, two or more system sensors 212 may be disposed at various locations in one or more components of the compressor system 100 that together can be used to infer one or more system parameters.

In some examples, the control system 200 can further include an ambient sensor 214 in addition to or instead of the system sensor 212. The ambient sensor 214 can also be in communication with the processor 208 and can be arranged to sense one or more ambient conditions of the environmental surroundings of the compressor system 100 (e.g., local atmospheric temperature or humidity). In some examples, the ambient sensor 214 can be a moisture sensor configured to sense a water content associated with the compressor system 100. For example, in some implementations, the ambient sensor 214 can be a humidity sensor configured to sense a local ambient humidity level external to the fluid compressor system 100. In some examples, the ambient sensor 214 can be a pressure sensor configured to sense a local atmospheric pressure external to the compressor system 100. In some cases, the ambient sensor 214 can be arranged along or near the air inlet valve 128 of the compressor system 100.

In some cases, the ambient sensor 214 can be arranged remote to the compressor system 100, and the controller 202 can further include a wireless communication module to wirelessly communicate with the remote ambient sensor 214 (e.g., directly or indirectly via an intervening computing or communication system). In some examples, one or more ambient sensors 214 can be disposed at various locations along the exterior of the compressor system 100 and one or more ambient sensors 214 can be arranged remote to the compressor system 100.

As noted above, it may be useful for the control system 200 to selectively control the system temperature $T_{system}$ of the compressor system 100. Referring still to FIG. 1, the system temperature $T_{system}$ can be increased or decreased by selectively controlling a temperature of oil from the oil sump that flows back into the compressor 120 via the oil inlet 138. For example, as noted above, the system temperature $T_{system}$ of the compressor system 100 can be maintained or reduced by cooling oil from the oil outlet 136 of the separator tank 132 in the oil cooler 140 before flowing the oil back into the compressor 120. Relatedly, the system temperature $T_{system}$ also can be maintained or increased by causing such oil to flow back into the compressor 120 uncooled. Accordingly, in some cases, the control system 200 can include a system temperature control device that can be controlled by a system temperature controller 216 of the controller 202 to selectively maintain, increase, or decrease the system temperature $T_{system}$ of the compressor system 100.

In some cases, a system temperature control device of the control system 200 can be the thermal control valve 142, configured as an electronically controlled valve in electrical communication with the system temperature controller 216 of the control system 200. In such cases, the system temperature controller 216 can be configured to selectively move the thermal control valve 142 to direct flow of oil along the oil outlet 136 of the separator tank 132 to the oil cooler 140 (as indicated by the solid line in FIG. 1) or to bypass the oil cooler 140 (as indicated by the dashed line in FIG. 1). Further, in such cases, the system temperature controller 216 of the controller 202 can be configured to control the thermal control valve 142 based on a system temperature $T_{system}$ determined based on signals received from one or more sensors (e.g., sensors 212 or 214) that can be arranged to sense a temperature within the thermal control valve 142 or for other components of the compressor system 100 (e.g., the compressor 120). In some cases, a system temperature control device of the control system 200 can include a control device to regulate flow though or around the oil cooler 140. For example, a control valve assembly (e.g., the thermal control valve 142) can be in electrical communication with and controlled by a system temperature controller 216 of the control system 200 to selectively vary cooling by the oil cooler 140.

Referring still to FIG. 1, the compressor system 100 can be configured to be operable in a plurality of operation modes. For example, the compressor system 100 can operate in a startup mode in which, starting from a non-operating mode (i.e., the compressor system 100 not being powered), the engine 108 of the compressor system 100 begins to power the compressor 120 and thus gradually increases the system pressure $P_{system}$ and a system temperature $T_{system}$ as ambient air is compressed in the compressor 120 (e.g., increases the pressure from ambient or other minimum pressure or increases the temperature from ambient or other minimum temperature). From the startup mode (or otherwise), the compressor system 100 can operate in a pressure supply mode in which the system pressure $P_{system}$ reaches levels at which compressed air can be appropriately supplied to the supply line 104 of the compressor system 100. From the pressure supply mode (or otherwise), the compressor system 100 can also operate in a shutdown or cooldown mode in which the power source 108 controllably decreases power to the compressor 120 and thereby permits the system pressure $P_{system}$ to decrease until the compressor system 100 enters a non-operating mode.

In some cases, the compressor system 100 can operate in an idle mode from the startup mode or pressure supply mode. In the idle mode, the compressor 120 continues to be powered by the engine 108 but does not intake ambient air from the air inlet valve 128 and thus, the pressure of compressed air in the separator or storage tank 132 is lowered while the minimum pressure valve 146 (or other downstream components) prevents flow of compressed air out of the separator tank 132.

As noted above, in some examples, the compressor system 100 can be configured to operate in a condensation prevention mode, including as part of or after a transition from one or more of the various other operation modes also presented herein. For example, in some cases, the compressor system 100 can operate in a condensation prevention mode as part of, or immediately after a startup mode, or during a pressure supply mode or an idle mode. Generally, when operating in the condensation prevention mode, the control system 200 can control the compressor system 100 based on a target operating temperature $T_{target}$, such that the system temperature $T_{system}$ of the compressor system 100 is controllably increased or maintained to be equal to or above a relevant dew point temperature. For example, a thermal control valve (e.g., the thermal control valve 142 of FIG. 1) can be controlled to increase or decrease the heat rejected by a cooler (e.g., the oil cooler 140), including by decreasing or increasing flow through a bypass flow conduit, respectively, as illustrated in FIG. 1. As a result, as also noted above, water vapor entrained in compressed air in the compressor system can be prevented from condensing to water liquid within the compressor system and can thus be prevented from causing the various issues noted above.

In some examples, the control system 200 of the compressor system 100 can be configured to cause the compressor system 100 to operate in a condensation prevention mode in response to one or more sensed environmental or operating conditions (e.g., via the system temperature controller 216). For example, in some implementations, the controller 202 of the control system 200 can be configured to automatically cause the compressor system 100 to operate in the condensation prevention mode in response to one or more sensed operating parameters (e.g., internal humidity or other internal moisture level) as determined based on output signals received from the system sensor 212, or one or more sensed ambient parameters (e.g., ambient humidity) as determined based on output signals received from the ambient sensor 214.

In some implementations, the control system 200 can include the ambient sensor 214 and the controller 202 can be configured to automatically cause the compressor system 100 to operate in the condensation prevention mode in response to an ambient humidity determined via data from the ambient sensor 214 (e.g., that exceeds a predetermined maximum ambient humidity that can be stored in the controller 202). In some examples, the control system 200 can include the system sensor 212 and the controller 202 can be configured to automatically cause the compressor system 100 to operate in the condensation prevention mode in response to an internal humidity determined via data from the system sensor 212 (e.g., that exceeds a predetermined maximum internal humidity as stored in a memory the controller 202).

In some examples, the control system 200 can include the system sensor 212, and the controller 202 can be configured to automatically cause the compressor system 100 to operate in the condensation prevention mode in response to a determined system temperature $T_{system}$. For example, the system temperature $T_{system}$ can be controlled with generally known proportional-integral-derivative (PID) algorithms to be maintained at or above a predetermined target operating temperature $T_{target}$ (e.g., as can be stored in a memory of the controller 202) or at or above a calculated target operating temperature $T_{target}$ (e.g., as can be calculated by the controller 202 based on environmental or system parameters, including an ambient humidity, a system pressure $P_{system}$, etc.).

As also noted above, in some examples, the compressor system 100 can be configured to operate in a water removal mode, including as part of or after a transition from one or more of the various other operation modes also presented herein. For example, the compressor system 100 can operate in a water removal mode as part of, or immediately after a startup mode, before operating in a pressure supply mode or an idle mode. In cases in which the compressor system 100 operates in the water removal mode after the startup mode and before the pressure supply mode, the compressor system 100 can have a first system pressure during the startup mode and a second system pressure that is greater than the first system pressure during the pressure supply mode. In some cases, the compressor system 100 can operate in a water removal mode after operating in a pressure supply mode or an idle mode and before (or as part of) a shutdown mode. In some cases, the compressor system 100 can operate in the water removal mode during a startup mode and a shutdown mode. Further, in some cases, the compressor system 100 can operate in the water removal mode at any period during the pressure supply mode (e.g., based on operator input or sensed operating conditions based on signals from the sensors 212 or 214).

Generally, when operating in the water removal mode, the control system 200 can control the compressor system 100 so that the system pressure $P_{system}$ of the compressor system 100 is reduced (or maintained) to (or below) a relevant saturation pressure (e.g., by controlling the block valve 204). As a result, as also noted above, liquid water in the system can be caused to rapidly vaporize, and the resulting water vapor can be more easily removed from the system (e.g., by venting to atmosphere).

In some examples, the control system 200 can operate a compressor system 100 in a water removal mode without increasing or decreasing the speed of the engine 108 relative to a previous set-point. This approach may be particularly beneficial, for example, because the oil pump 144 may be powered by engine 108 and thus, if the engine speed of the engine 108 is reduced then the circulation of oil by the oil pump 144 may also be reduced. Further, in some cases, efficiency or other considerations may weigh against frequent changes in engine speed.

As also generally noted above, the control system 200 of the compressor system 100 can be configured to cause the compressor system 100 to operate in a water removal mode in response to one or more operating or environmental conditions. For example, in some implementations, the controller 202 of the control system 200 can be configured to automatically cause the compressor system 100 to operate in the water removal mode in response to one or more sensed operating parameters (e.g., system moisture level) as determined based on output signals received from the system sensor 212, or one or more sensed ambient parameters (e.g., ambient humidity) as determined based on output signals received from the ambient sensor 214. In some implementations, the control system 200 can include the ambient sensor 214 and the controller 202 can be configured to automatically cause the compressor system 100 to operate in the water removal mode in response to a determined ambient humidity (e.g., that exceeds a predetermined maximum ambient humidity that can be stored in the controller 202). The ambient humidity level and one or more other operating parameters (e.g., a continuous or non-continuous run time of the compressor system 100 during a period of time, such as, hourly or daily) can be indicative of a water content within the compressor system 100. As such, in some examples, the controller 202 of the control system 200 can be configured to automatically cause the compressor system 100 to operate in the water removal mode in response to a sensed ambient humidity. In some cases, operation in the water removal mode can be based on a sensed ambient humidity in combination with one or more other operating parameters that can be determined or tracked by the controller 202 with or without signals from the system sensor 212 (e.g., a continuous or non-continuous run time of the compressor system 100, an amount of time the compressor system 100 is operated in an idle mode, the system temperature $T_{system}$, etc.).

In some examples, the controller 202 of the control system 200 can be configured to initiate a water removal mode in response to receiving relevant user inputs (e.g., push-button requests to operate in a water removal mode). In some examples, the controller 202 of the control system 200 can be configured to automatically initiate a water removal mode at predetermined periods during one or more operation modes of the compressor system 100 (e.g., during a startup mode, and after the compressor system 100 has reached a particular operating temperature). For example, in some implementations, a startup mode of the compressor system 100 having the control system 200 can include: (i) starting the engine 108 (as already engaged with the compressor 120) or engaging the engine 108 with the compressor 120; (ii) operating the engine 108 at a startup (e.g., idle) speed; (iii) determining a moisture level for (e.g., within) the compressor system 100 (e.g., based on signals received from the system sensor 212 or another sensor); (iv) based on the moisture level (e.g., if the moisture level exceeds a predetermined maximum moisture content value stored in the controller 202); (v) causing the compressor system 100 to operate in a water removal mode (e.g., for a predetermined amount of time); and (vi) subsequently causing the compressor system 100 to operate in a pressure supply mode with the engine 108 operating at an operating speed that is greater than or equal to the startup operating speed and the compressor system 100 at an operational pressure to supply service air.

Similarly, for example, a shutdown mode of the compressor system 100 having the control system 200 can include: (i) in response to a user input or other command to shut down the compressor system 100, while operating in a pressure supply mode with an engine 108 operating at a first operating speed, determining a moisture level within the compressor system 100 in the controller 202 (e.g., from signals received from the system sensor 212); (ii) based on the moisture level (e.g., if the moisture level exceeds a predetermined maximum moisture content stored in the controller 202), causing the compressor system 100 to operate in the water removal mode (e.g., for a predetermined amount of time); and (iii) after operating in the water removal mode, shutting down the engine 108 or disengaging the engine 108 from the compressor 120.

Figure 2:
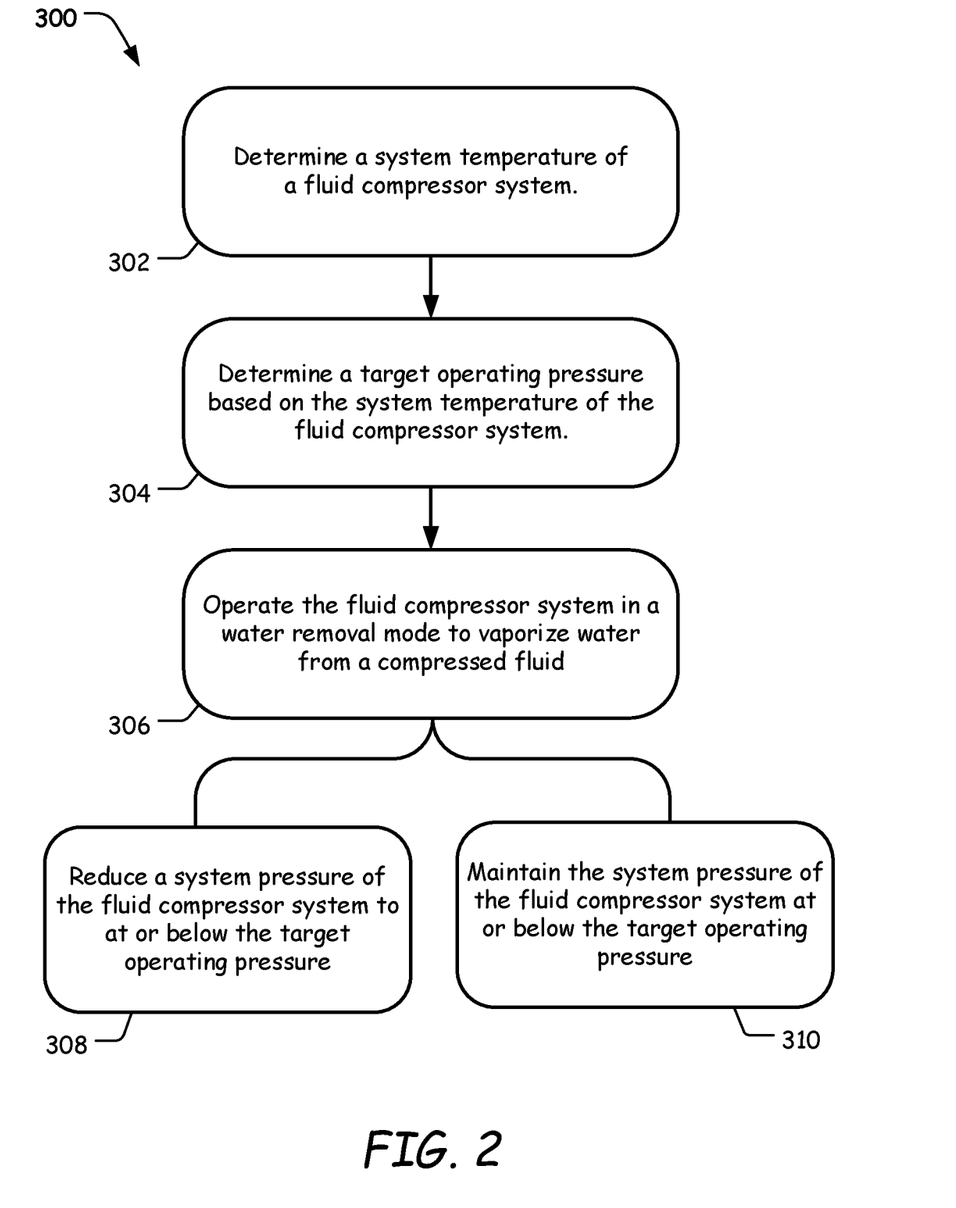
FIG. 2 is a flowchart of a method of operating a compressor system, according to aspects of the disclosure.

Referring to FIG. 2, an example method 300 is illustrated for operating a compressor system in a water removal mode according to some aspects of the disclosure. While the method 300 is described below with reference to the compressor system 100 as discussed above, the method can also be used with other types of rotating machines. Additionally, operations of the method 300 need not be carried out in the specific order discussed below and, in some cases, may be implemented with other control devices and systems not explicitly described herein.

At block 302, the method 300 can include determining a system temperature of a fluid compressor system. For example, in the illustrated implementation of FIG. 1, the control system 200 can be configured to determine the system temperature $T_{system}$ of the compressor system 100. More specifically, the processor 208 of the controller 202 can be configured to determine the system temperature $T_{system}$ using outputs received from the system sensor 212, which can be configured as a temperature sensor. In some examples, a system temperature can be determined indirectly, rather than based on signals from a temperature sensor. For example, measured system pressure and known volumes can be used to derive associated temperatures, temperatures can be determined based on an elapsed time under certain operating conditions (e.g., an elapsed time after initial startup of the compressor system 100 or an elapsed time of operation in a pressure supply mode), etc.

Figure 3:
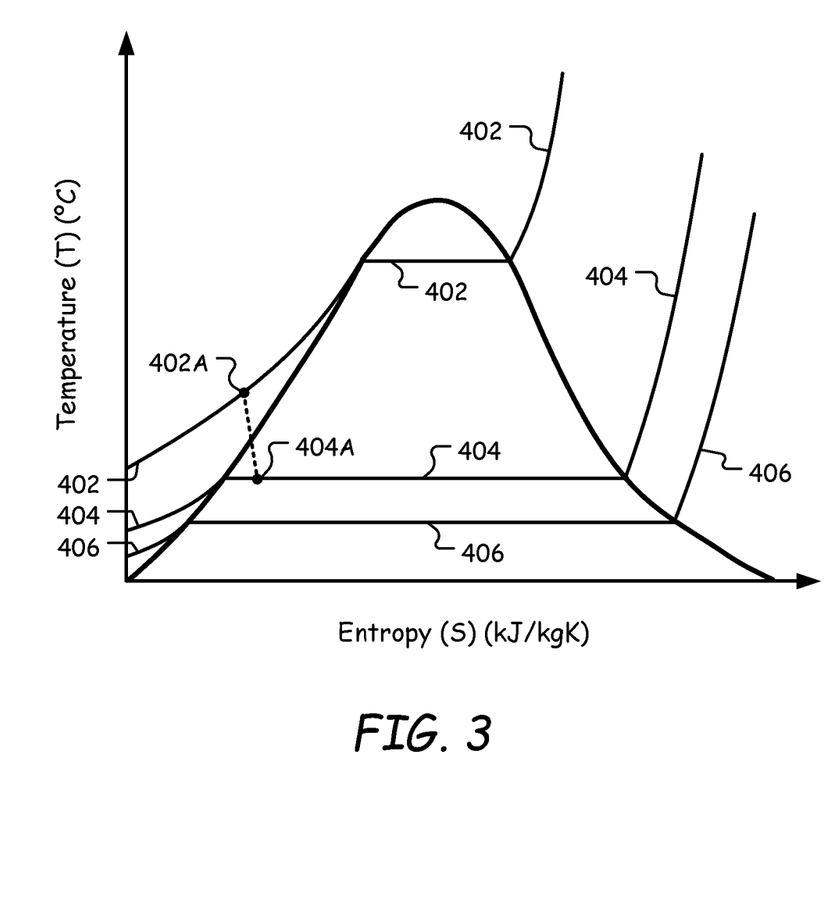
FIG. 3 is a diagram illustrating a temperature-entropy (T-S) relationship of water within a compressor system, illustrating aspects of operation of a compressor system according to the method of FIG. 2.

With the determined system temperature from block 302, the method 300 can include at block 304 determining a target operating pressure based on the system temperature of the fluid compressor system. For example, the processor 208 of the controller 202 can be configured to determine the target operating pressure $P_{target}$ using the previously determined system temperature $T_{system}$ (e.g., as determined at block 302). As previously discussed, the target operating pressure $P_{target}$ can generally be determined (at block 304) to be at or below a saturation pressure of water that corresponds to the determined system temperature $T_{system}$. The saturation pressure of water (Ps) can generally be calculated by:

$$\frac{dP_S}{dT} = \frac{L}{TV} \quad (1)$$

where T is the temperature of water, L is the latent heat of vaporization (Jkg$^{-1}$), and V is the specific volume of water vapor (m$^3$ kg$^{-1}$). However, various correlations or predetermined tables can be used to determine a target operating pressure without, for example, executing calculations according to Equation (1). For example, for a given system temperature $T_{system}$ the controller 202 can be configured to interrogate a stored lookup table to determine a corresponding target operating pressure $P_{target}$. In some examples, as generally represented in FIG. 3, a predetermined temperature-entropy (T-S) diagram for a particular composition (e.g., water) can indicate a saturation pressure for a given system temperature $T_{system}$, at which thermodynamic behavior of the composition will result in near instantaneous transition of liquid to gas. Thus, for example, established T-S data for known compositions can also indicate a relevant range for the target operating pressure $P_{target}$.

In some examples, the processor 208 of the control system 200 can be configured to calculate the target operating pressure $P_{target}$ using a particular correlation or other equation (e.g., Equation (1), above). In some examples, the control system 200 can further include a memory (not shown) in communication with the processor 208. In such examples, the memory of the control system 200 can store one or more relevant look-up tables (e.g., as populated with pressure and temperature values as represented in the T-S diagram of FIG. 3), and can then determine the corresponding target operating pressure $P_{target}$ by interrogating the look-up table(s) using the determined system temperature $T_{system}$.

With the determined target operating pressure from block 304, the method 300 can include at block 306 operating the fluid compressor system in a water removal mode to vaporize water from a compressed fluid. In particular, a relevant control device can control a relevant compressor system to operate at the target operating pressure $P_{target}$ for some amount of time and thereby flash vaporize condensation for removal from the system. For example, in the illustrated implementation of FIG. 1, the control system 200 can be configured to cause the compressor system 100 to operate in a water removal mode by controlling the system pressure $P_{system}$ of the compressor system 100 based on the target operating pressure $P_{target}$ to vaporize at least part of the liquid water in the compressor system 100. More specifically, the processor 208 of the controller 202 can be configured to send a signal to the system pressure controller 206 to control the block valve 204 such that the compressor system 100 operates in the water removal mode.

Generally, operating a fluid compressor in a water removal mode (e.g., at block 306) can include operating the fluid compressor at a relevant system pressure at or below a target operating pressure. In some cases, operations at block 306 can thus include, at block 308, reducing a system pressure of the fluid compressor system to at or below the target operating pressure. For example, in the illustrated implementation of FIG. 1, the control system 200 can be configured to reduce the system pressure $P_{system}$ of the compressor system 100 from a higher operational pressure (e.g., to provide service air at the supply line 104) to a pressure that is at or below the target operating pressure $P_{target}$. More specifically, the processor 208 of the controller 202 can be configured to send command signals to the system pressure controller 206 to further open the block valve 204 until the system pressure $P_{system}$ decreases to or below the determined target operating pressure $P_{target}$. Thus, for example, referring again to FIG. 3, the system pressure $P_{system}$ of the compressor system 100 can be reduced from a high pressure, represented at line 402, to a low pressure (e.g., the target operating pressure $P_{target}$), represented at line 404. Accordingly, from an example starting state 402A, a reduction in the system pressure $P_{system}$, assuming minimal changes in the temperature of physical system components that are in contact with the compressed air, will transition water from the compressed liquid state 402A to a saturated state (see, e.g., point 404A) that enables the liquid water to vaporize. In some implementations, this vaporization process can be accelerated by further reducing the system pressure $P_{system}$ (e.g., to a pressure represented at line 406).

Additionally or alternatively, operating a fluid compressor in a water removal mode (e.g., at block 306) can include maintaining a relevant system at or below a target operating pressure. In some cases, operations at block 306 can thus include at block 310 maintaining system pressure at or below a target operating pressure. For example, when a system pressure of the fluid compressor system has already been reduced or is already below a target operating pressure (e.g., when the fluid compressor system is operated in the water removal mode shortly after initiation of the startup mode), block 310 of the method 300 can include maintaining the system pressure of the fluid compressor system at or below the target operating pressure (e.g., rather than necessarily reducing the system pressure below the target operating pressure). In some examples, operations at block 310 can include maintaining system pressure based on sensor or other inputs. For example, in the illustrated implementation of FIG. 1, the controller 202 of control system 200 can be further configured to continuously monitor the system pressure $P_{system}$ as outputs from the system sensor 212 are continuously received and processed in the processor 208, in addition to the system temperature $T_{system}$. In such cases, the processor 208 can be configured to command the system pressure controller 206 to further open (or close) the block valve 204 to help maintain the system pressure $P_{system}$ at or below the target operating pressure $P_{target}$, even as the system temperature $T_{system}$ or other operating conditions change over time.

In some examples, once the control system 200 causes the system pressure $P_{system}$ to be at or below the target operating pressure $P_{target}$, the target operating pressure $P_{target}$ may be maintained for a particular period of time in order to vaporize a sufficient portion of the condensed water in the compressor system 100. As such, in some cases, the control system 200 can be configured to maintain the system pressure $P_{system}$ at the target operating pressure $P_{target}$ (i.e., operate in the water removal mode) for a predetermined or variably determined amount of time. For example, in some implementations, the control system 200 can be configured to cause the compressor system 100 to operate in the water removal mode for a predetermined period of time that can be stored in the memory (not shown) of the controller 202 (e.g., five minutes or less). In some examples, such a predetermined (or other) time period can be adjusted by a user. In some examples, the control system 200 can be configured to cause the compressor system 100 to operate in the water removal mode until a sensed parameter of the compressor system 100 reaches (e.g., decreases to) a predetermined level. In such examples, for example, the system sensor 212 can be configured to sense amounts of moisture present within the compressor system 100 (i.e., a system moisture level) and the processor 208 can be configured to determine the system moisture level based on output signals received from the system sensor 212. In some examples, such a predetermined (or other) level of the one or more sensed parameters can be adjusted by a user.

As also generally discussed above, water that has been vaporized according to the method 300 (or otherwise according to this disclosure) can then be readily removed from the compressor system. For example, some amount of the vapor will naturally escape to atmosphere along normal vent and leakage paths. In some examples, a heat exchanger (not shown) along a service line can be used to recondense the vaporized liquid, to be separated and routed to another removal location (e.g., a muffler).

Also as generally discussed above, a water removal mode can sometimes be implemented automatically (or otherwise), including as part of or as a required precursor or successor to a particular other operating mode. In some examples, a water removal mode can be implemented automatically as part of a startup procedure of a startup mode (e.g., implemented after system temperature is determined to reach a threshold value sufficient for the intended vaporization), as part of a shutdown process (i.e., as part of a predetermined sequence of operations for a controlled cessation of operation of a compressor system), or otherwise. In some cases, water removal can be automatically implemented during a startup or shutdown sequence without reference to sensor input (e.g., without reference to moisture level as sensed by a moisture sensor, as discussed in startup and shutdown examples above).

In some cases, a water removal (or other) mode can be implemented after operation in a condensation prevention mode. For example, a control system can operate a compressor system in a condensation prevention mode until a particular control parameter satisfies one or more criteria (e.g., a system temperature $T_{system}$ exceeds a temperature threshold, a maximum time interval has expired, a measured water content satisfies a predetermined or calculated limit, etc.). Then the control system can automatically (or otherwise) command a corresponding transition from the condensation prevention mode to a normal operating mode, to a water removal mode, etc. Thus, for example, condensation can be prevented in a compressor system using a condensation prevention mode, then the compressor system can be transitioned to a water removal mode, as needed, to refresh the compressor system to a lower system temperature (and to a reduced liquid water content as applicable).

Thus, some examples of the disclosure can provide improved systems and methods for preventing water condensation within, and removing accumulated liquid water from compressor systems. For example, some implementations can include automatically and temporarily reducing system pressure to flash vaporize liquid water or automatically increasing system temperature to prevent water vapor from condensing without substantial disruption to operation of the relevant system.

In some implementations, devices or systems disclosed herein can be utilized, manufactured, installed, etc. using methods embodying aspects of the present disclosure. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as examples of the disclosed technology, of the utilized features and implemented capabilities of such device or system.

In some examples, aspects of the present disclosure, including computerized implementations of methods according to the present disclosure, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, implementations of the disclosed technology can be implemented as a set of instructions, tangibly embodied on a non-transitory computer-readable media, such that a processor device can implement the instructions based upon reading the instructions from the computer-readable media. Some examples of the present disclosure can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). In some examples, a control device can include a centralized hub controller that receives, processes and (re)transmits control signals and other data to and from other distributed control devices (e.g., an engine controller, an implement controller, a drive controller, etc.), including as part of a hub-and-spoke architecture or otherwise.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the present disclosure, or of systems executing those methods, may be represented schematically in the FIGs. or otherwise discussed herein. Unless otherwise specified or limited, representation in the FIGs. of particular operations in particular spatial order may not necessarily require those operations to be executed in a particular sequence corresponding to the particular spatial order. Correspondingly, certain operations represented in the FIGs., or otherwise disclosed herein, can be executed in different orders than are expressly illustrated or described, as appropriate for particular implementations of the disclosed technology. Further, in some examples, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Additionally, as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

The previous description of the exemplary implementations is provided to enable any person skilled in the art to make or use the disclosed technology. Various modifications to these implementations will be readily apparent to those skilled in the art, and the generic principles defined herein may be applied to other implementations without departing from the spirit or scope of the present disclosure. Thus, the present disclosure is not intended to be limited to the implementations shown herein but is to be accorded the widest scope consistent with the principles and novel features disclosed herein.

I claim:

1. A fluid compressor system comprising:
   a compressor having a compressor inlet and a compressor outlet, the compressor being configured to receive fluid at the compressor inlet and supply compressed fluid at the compressor outlet;
   a power source operably connected to the compressor to power the compressor to supply the compressed fluid;
   a separator tank in fluid communication with the compressor outlet to receive the compressed fluid and separate entrained liquid from the compressed fluid; and
   a control system, including one or more control devices configured to:
      determine a system temperature of the fluid compressor system;
      determine a target operating pressure based on the system temperature; and
      selectively operate the fluid compressor system in a water removal mode, including controlling a system pressure of the fluid compressor system based on the target operating pressure to vaporize at least part of the entrained liquid.

2. The fluid compressor system of claim 1, wherein the one or more control devices are configured to control a solenoid valve in fluid communication with the separator tank to control the system pressure.

3. The fluid compressor system of claim 1, wherein the one or more control devices are configured to operate the fluid compressor system in the water removal mode for a predetermined amount of time.

4. The fluid compressor system of claim 1, wherein the power source is an engine; and
   wherein the control system is configured to operate the engine at substantially the same speed while the fluid compressor system is operated in a pressure supply mode and while the fluid compressor system is operated in the water removal mode.

5. The fluid compressor system of claim 1, wherein the control system further comprises a temperature sensor configured to sense the system temperature; and
   wherein the one or more control devices are further configured to determine the target operating pressure in response to signals from the temperature sensor.

6. The fluid compressor system of claim 1, wherein the control system further comprises a moisture sensor configured to sense a water content associated with the fluid compressor system; and
   wherein the control system is further configured to automatically cause the fluid compressor system to operate in the water removal mode in response to signals from the moisture sensor.

7. The fluid compressor system of claim 6, wherein the water content indicates an ambient humidity external to the fluid compressor system.

8. The fluid compressor system of claim 6, wherein the water content indicates an amount of liquid water within a volume of oil within the fluid compressor system.

9. The fluid compressor system of claim 8, wherein the control system is configured to operate the fluid compressor system in the water removal mode until the amount of liquid water within the volume of oil is reduced to a predetermined amount.

10. The fluid compressor system of claim 1, wherein the control system is configured to operate the fluid compressor system in the water removal mode automatically as part of at least one of a startup process for the fluid compressor system or a shutdown process for the fluid compressor system.

11. A fluid compressor system comprising:
    a compressor having a compressor inlet and a compressor outlet, the compressor being configured to receive fluid at the compressor inlet and supply compressed fluid at the compressor outlet;
    a power source operably connected to the compressor to power the compressor to supply the compressed fluid;
    a separator tank in fluid communication with the compressor outlet to receive the compressed fluid and separate entrained liquid from the compressed fluid; and
    a control system, including one or more control devices configured to:
       determine a target operating temperature; and
       selectively operate the fluid compressor system in a condensation prevention mode to reduce condensation of water entrained within the compressed fluid, including controlling a system temperature of the fluid compressor system based on the target operating temperature.

12. The fluid compressor system of claim 11, wherein the control system further comprises a moisture sensor configured to sense a water content associated with the fluid compressor system; and
    wherein the control system is further configured to automatically cause the fluid compressor system to operate in the condensation prevention mode in response to signals from the moisture sensor.

13. The fluid compressor system of claim 12, wherein the water content indicates one or more of an ambient humidity external to the fluid compressor system or an internal humidity within the fluid compressor system.

14. The fluid compressor system of claim 11, further comprising:
    an oil cooler arranged to cool oil for the compressor; and
    a control valve arranged to control flow of oil to or from the oil cooler;
    wherein the control system is further configured to control the system temperature by selectively controlling the control valve based on the target operating temperature.

15. The fluid compressor system of claim 11, wherein the control system is further configured to cause the fluid compressor system to operate in the condensation prevention mode then transition to a water removal mode that includes:
    determining a current system temperature of the fluid compressor system;
    determining a target operating pressure based on the current system temperature; and selectively operate the fluid compressor system in a water removal mode, including controlling a system pressure of the fluid compressor system based on the target operating pressure to vaporize entrained liquid within the fluid compressor system.

16. A method for operating a fluid compressor system, the fluid compressor system being configured to supply a compressed fluid using power from a power source, the method comprising:
   determining, with a control device, a system temperature of the fluid compressor system;
   determining, with the control device, a target operating pressure based on the system temperature of the fluid compressor system; and
   operating the fluid compressor system, with the control device, in a water removal mode to one or more of:
      reduce a system pressure of the fluid compressor system to at or below the target operating pressure to vaporize water from the compressed fluid; or
      maintain the system pressure of the fluid compressor system at or below the target operating pressure to vaporize water from the compressed fluid.

17. The method of claim 16, wherein determining the system temperature includes determining the system temperature as a first system temperature during operation of the fluid compressor system at a first operating pressure; and
   wherein operation of the fluid compressor system in the water removal mode includes determining the target operating pressure to be less than the first operating pressure.

18. The method of claim 16, wherein operation of the fluid compressor system in the water removal mode is included in operation of the fluid compressor system in a startup mode; and
   wherein the method further comprises, after operating in the startup mode, operating in a pressure supply mode with the fluid compressor system at a second operating pressure that is greater than the target operating pressure.

19. The method of claim 16, wherein operation of the fluid compressor system in the water removal mode is included in operation of the fluid compressor system according to a predetermined shutdown sequence for the fluid compressor system.

20. The method of claim 16, further comprising one or more of:
   ending operation of the fluid compressor system in the water removal mode based on a sensed moisture within the fluid compressor system; or
   ending operation of the fluid compressor system in the water removal mode after a predetermined time of operating in the water removal mode.

* * * * *